US007958969B2

(12) United States Patent
Inoue et al.

(10) Patent No.: US 7,958,969 B2
(45) Date of Patent: Jun. 14, 2011

(54) TRANSFER DEVICE FOR VEHICLE

(75) Inventors: Toru Inoue, Obu (JP); Satoshi Munakata, Nishikamo-gun (JP)

(73) Assignees: Aisin Ai Co., Ltd., Nishio-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 556 days.

(21) Appl. No.: 11/655,831

(22) Filed: Jan. 22, 2007

(65) Prior Publication Data

US 2007/0289816 A1 Dec. 20, 2007

(30) Foreign Application Priority Data

May 25, 2006 (JP) ................. 2006-145363

(51) Int. Cl.
 *F16H 57/04* (2010.01)
 *B60K 17/34* (2006.01)
(52) U.S. Cl. .......... 184/6.12; 74/467; 180/233; 180/241
(58) Field of Classification Search .................. 184/6.12
 See application file for complete search history.

(56) References Cited

U.S. PATENT DOCUMENTS

| | | | | |
|---|---|---|---|---|
| 3,746,128 A | * | 7/1973 | Wunsch ........................ | 184/6.11 |
| 3,757,535 A | * | 9/1973 | Stein ............................. | 464/16 |
| 3,889,489 A | * | 6/1975 | Casey et al. .................... | 464/16 |
| 4,690,015 A | * | 9/1987 | Nagano et al. ................ | 475/295 |
| 4,713,980 A | * | 12/1987 | Ida et al. ........................ | 74/467 |
| 4,841,803 A | * | 6/1989 | Hamano et al. ........... | 74/665 GE |
| 5,419,413 A | * | 5/1995 | Nakata et al. ................. | 184/6.14 |
| 5,584,776 A | * | 12/1996 | Weilant et al. ................ | 475/213 |
| 5,597,369 A | * | 1/1997 | Brissenden et al. ............ | 475/89 |

FOREIGN PATENT DOCUMENTS

| | | |
|---|---|---|
| EP | 0202951 A2 * | 11/1986 |
| JP | 61-270562 A | 11/1986 |
| JP | 1-65977 U | 4/1989 |
| JP | 2-58157 U | 4/1990 |
| JP | 07-071612 (A) | 3/1995 |

OTHER PUBLICATIONS

Office Action issued Apr. 8, 2008 by the Japanese Patent Office in Japanese Patent Application No. 2006-145363 and English language translation of the Office Action.
Office Action issued Nov. 18, 2008 by the Japanese Patent Office in Japanese Patent Application No. 2006-145363 and English language translation of the Office Action.

* cited by examiner

*Primary Examiner* — Bradley T King
*Assistant Examiner* — Mahbubur Rashid
(74) *Attorney, Agent, or Firm* — Buchanan Ingersoll & Rooney PC

(57) ABSTRACT

A transfer device for a vehicle includes a casing, a cylindrical input shaft supported by the casing, a first end of the input shaft engaging with a driveshaft, an output shaft supported on an internal surface of a second end of the input shaft and engaging with the second end of the input shaft, the output shaft including an oil passage formed therein in an axial direction, and a lubrication fluid supply passage supplying a lubrication fluid from the casing to the oil passage. The lubrication fluid supply passage includes an inner fluid tight chamber annularly formed with an external surface of the output shaft and an internal surface of the input shaft, a first passage establishing a communication between the inner fluid tight chamber and the oil passage, and a second passage establishing a communication between the inner fluid tight chamber and an external surface of the input shaft.

10 Claims, 3 Drawing Sheets

TRANSFER DEVICE FOR VEHICLE

CROSS REFERENCE TO RELATED APPLICATIONS

This application is based on and claims priority under 35 U.S.C. §119 with respect to Japanese Patent Application No. 2006-145363 filed on May 25, 2006, the entire content of which is incorporated herein by reference.

FIELD OF THE INVENTION

The present invention relates to a transfer device for a vehicle. More particularly, the present invention pertains to a lubrication system of a transfer device having an oil passage within a shaft.

BACKGROUND

Generally, transfer devices for vehicles are connected to a transmission and distribute torque from an input shaft to two output shafts eventually to transmit the torque to front and rear wheels. The transfer devices are usually applied with a center differential and an auxiliary transmission mechanism. The center differential automatically adjusts differences in rotational speeds between the front wheels and rear wheels. Some center differentials selectively switch between four-wheel drive mode and two-wheel drive mode. The auxiliary transmission mechanism is usually configured to have two shift stages such as high and low. By combining the shift stages of the auxiliary transmission mechanism with shift stages of a transmission, multiple shift stages are achieved. The center differential and the auxiliary transmission mechanism generally include a gear mechanism such as a planetary gear set. In order to prevent the abrasion and/or overheating of the gear mechanism and supporting portions of an input shaft and an output shaft, the lubrication fluid sealed within a casing of the transfer device for the vehicles is circulated therein to lubricate each portion.

The lubrication systems applied to transfer devices and transmissions are similar in structure. For example, with a lifting system, the lubrication fluid, reserved at the bottom portion of the casing, is lifted by a rotating gear which spreads the lubrication fluid so that the lubrication reaches each of the portions. According to a known lubrication system for an oil seal described in JPH07-071612A, which is an example of the lifting system, the lifted lubrication fluid is received by an oil receiver and flows into a sealing portion by means of a guide rib. In the meantime, because the lubrication fluid is not adequately forced to portions to be lubricated because of the reaction force of the centrifugal force exerted thereon when directly applying the lifted lubrication fluid to the gear which rotates at high speed, the adequate lubrication is unlikely to be provided. Accordingly, a system having a passage in a shaft is also applied as a lubrication system. With the construction of the system having a passage in a shaft, an oil passage in an axial direction and another oil passage in a radial direction are formed inside a shaft, and the lubrication fluid is introduced from an oil receiver to be supplied to desired locations. In case the lubrication fluid is unlikely lifted because of the level difference in a casing and other constructional limitations and/or in case a large degree of flow rate of lubrication fluid is required, a pump which is driven by a rotational shaft may be applied to suck the lubrication fluid.

With known transfer devices which include the center differential and/or the auxiliary transmission mechanism, an oil passage is most likely formed inside an output shaft in order to lubricate gear mechanisms thereof. In case a pump is provided in the transfer device, it is favorable to use an input shaft, which stably rotates without being affected by a gear ratio and a connection and disconnection of the center differential, as a drive source without providing an additional operational power source. Further, in known transfer devices, in order to downsize the transfer devices, an input shaft is shaped approximately in cylindrical form and a pilot bearing is arranged inside of the input shaft to support an output shaft coaxially to the input shaft and to be relatively relatable, so that the length of the transfer device per se is reduced in an axial direction. With this structure, a lubrication fluid supply passage which penetrates through the input shaft is provided for introducing the lubrication fluid from a pump positioned in the vicinity of the input shaft to a passage provided inside the output shaft.

As mentioned above, a transfer device is connected to a transmission. Particularly, for downsizing the transfer device, an input shaft of the transfer device is engaged, by means of a spline, directly to an output shaft of a transmission. Further, with the known structures of the transfer device, the input shaft is required to have the lubrication fluid supply passage and also to support the output shaft. Thus, a spline, the lubrication fluid supply passage, and the pilot bearing are arranged in an axial direction in an internal periphery of the approximately cylindrical input shaft, which makes it difficult to reduce the length in the axial direction and to downsize the transfer device per se.

A need thus exists for a transfer device, which has a shorter length in an axial direction by changing arrangements of a lubrication fluid supply passage.

SUMMARY OF THE INVENTION

In light of the foregoing, the present invention provides a transfer device for a vehicle, which includes a casing, a cylindrical input shaft supported by the casing so as to rotate, a first end of the input shaft engaging with a driveshaft for driving the input shaft, an output shaft supported on an internal surface of a second end of the input shaft so as to relatively rotate and directly or indirectly engaging with the second end of the input shaft to transmit a torque to driven members, the output shaft including an oil passage formed therein in an axial direction, and a lubrication fluid supply passage supplying a lubrication fluid from the casing to the oil passage formed in the axial direction in the output shaft. The lubrication fluid supply passage includes an inner fluid tight chamber annularly formed with an external surface of the output shaft and an internal surface of the input shaft, a first passage establishing a communication between the inner fluid tight chamber and the oil passage formed in the axial direction, and a second passage establishing a communication between the inner fluid tight chamber and an external surface of the input shaft.

According to another aspect of the present invention, a transfer device for a vehicle includes a casing, a cylindrical input shaft supported by the casing so as to rotate, a first end of the input shaft engaging with a driveshaft for driving the input shaft, an output shaft supported on an internal surface of the input shaft so as to relatively rotate and directly or indirectly engage with a second end of the input shaft to transmit a torque to driven members, the output shaft including an oil passage therein in an axial direction, and a lubrication fluid supply passage supplying a lubrication fluid from the casing to the oil passage formed in the axial direction in the output shaft. The lubrication fluid supply passage includes an outer fluid tight chamber annularly formed between an internal surface of the casing and an external surface of the input shaft, an inner fluid tight chamber annularly formed with an external surface of the output shaft and an internal surface of the input shaft, a first passage establishing a communication between the inner fluid tight chamber and the oil passage formed in the axial direction, and a second passage extending in an axial direction and establishing a communication between the inner fluid tight chamber and the outer fluid tight chamber.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
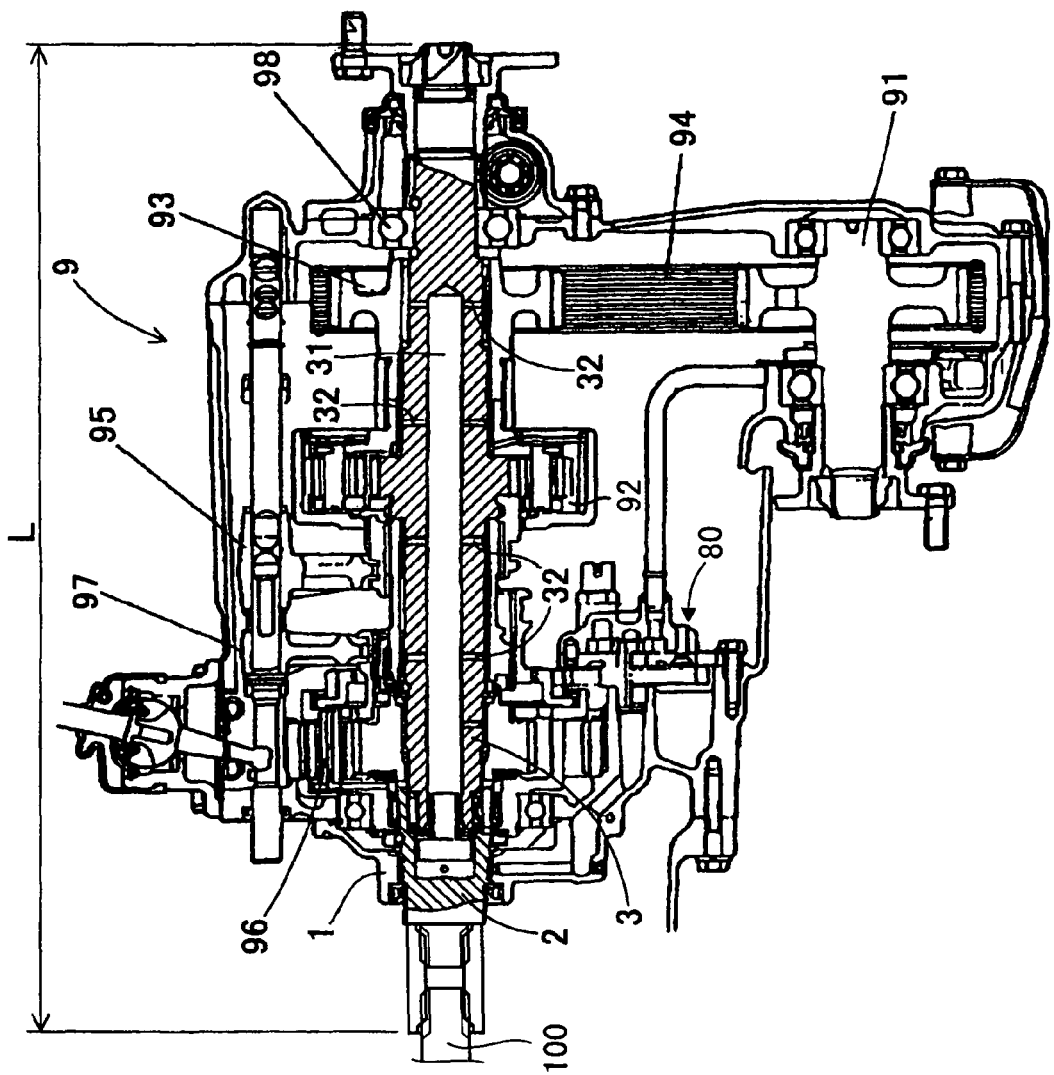
FIG. 1 is a cross-sectional view of a transfer device for a vehicle according to an embodiment of the present invention.

One embodiment of the present invention will be explained with reference to illustrations of the drawing figures as follows.

In FIG. 1, proper hatchings are provided only for an input shaft and an output shaft for an explanatory purpose. A transfer device 9, shown in FIG. 1, splits and transmits the torque from an input shaft 2 to an output shaft 3 and a second output shaft 91. The transfer device 9 includes a center differential 92 and an auxiliary transmission mechanism 96.

The input shaft 2, supported by a casing 1, is configured to transmit the torque inputted from a driveshaft 100 to the output shaft 3 via the auxiliary transmission mechanism 96. The auxiliary transmission mechanism 96 constructed with a planetary gear set and a gear ratio thereof is controlled by a high-and-low shift fork shaft 97. A first end of the output shaft 3 is supported inside the input shaft 2, and a second end of the output shaft 3 is supported at the casing 1 by means of a ball bearing portion 98 to be rotatable. The center differential 92 is provided at the central portion of the output shaft 3 to distribute the torque eventually to front and rear wheels and to drive the second output shaft 91 by the distributed torque via a distribution gear 93 and a silent chain 94. The center differential 92 includes a planetary gear set, and the connection and disconnection of the center differential 92 is controlled by a front drive shift form shaft 95. The output shaft 3 is connected to rear wheels and the second output shaft 91 is connected to front wheels. According to the structure shown in FIG. 1, either a locked state of the center differential 92, where a difference in rotation speed between the front wheels and the rear wheels is not allowed, or a free state of the center differential 92, where the difference in rotation speed between the front wheels and the rear wheels is allowed, is selectively switched by the connection and disconnection of the center differential 92.

An axial oil passage 31 is formed in an axial center inside the output shaft 3. Plural radial oil passages 32 are formed in the output shaft 3 in radial directions from the axial oil passage 31 to an external periphery of the output shaft 3. At least one of the radial oil passages 32 faces each of the center differential 92, the auxiliary transmission mechanism 96, and the distribution gear 93 to supply the lubrication fluid thereto.

The lubrication fluid is supplied to the radial oil passage 31 from the left side in FIG. 1 through a lubrication fluid supply passage.

Figure 2:
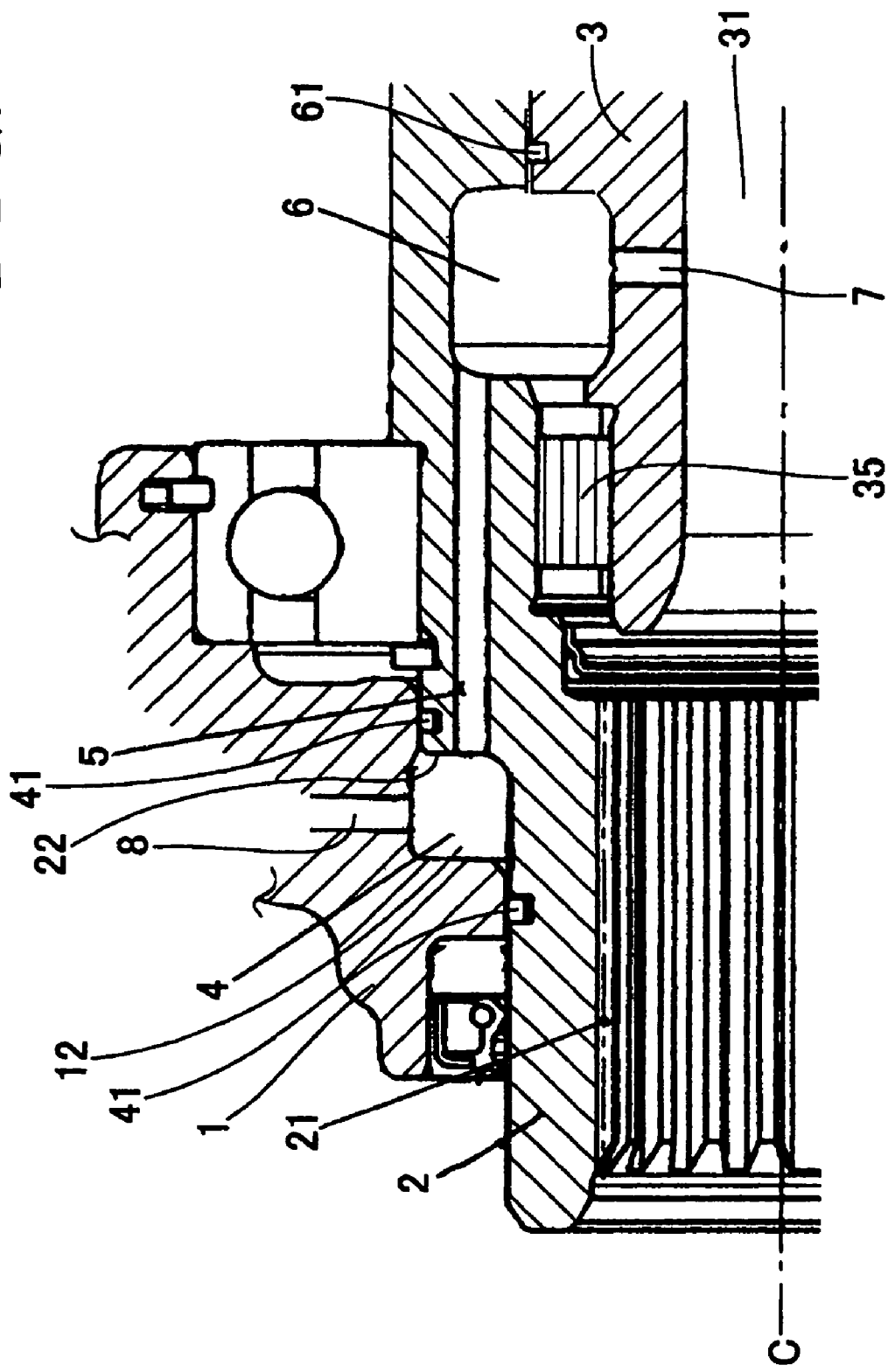
FIG. 2 is a partial cross-sectional view for a main portion of the transfer device for the vehicle according to the embodiment of the present invention.

As shown in FIG. 2 in details, the transfer device 9 includes the casing 1, the input shaft 2, the output shaft 3, and the lubrication fluid supply passage.

A first end of the input shaft 2 formed approximately in cylindrical shape is projected outside (i.e., to the right in FIGS. 1-2) of the casing 1. An output shaft (i.e., a driveshaft 100) of a transmission is engaged with a spline (i.e., serving as a spline engagement portion) 21 which is provided on an internal periphery of the input shaft 2. A stepped portion 22 is formed on an external periphery of the input shaft 2 approximately at the central portion of the input shaft 2 in an axial direction. The input shaft 2 has a larger diameter on the right side in FIG. 2 relative to the stepped portion 22. A stepped portion 12 is formed on an internal periphery of the casing 1 which rotatably supports the input shaft 2. A diameter of the casing 1 is greater on the right side in FIG. 2 than the left side relative to the stepped portion 12. As shown in FIG. 2, by assembling the casing 1 and the input shaft 2 separating the stepped portions 12, 22 from each other in the axial direction, annular space serving as an outer fluid tight chamber 4 is formed between the stepped portions 12, 22. Grooves are circumferentially formed throughout the external surface of the input shaft 2 on the both sides relative to the outer fluid tight chamber 4. A packing 41 is provided in each of the grooves formed on the external surface of the input shaft 2 to seal the oil. A pump 80 is provided at the casing 1. A pump oil passage 8 is formed in the casing 1 to establish communication between the pump 80 and the outer fluid tight chamber 4 and is configured to be supplied with the lubrication fluid with the pressure. Plural penetration holes serving as outer introduction oil passages 5 are formed in the input shaft 2 extending from the stepped portion 22 of the input shaft 2 towards a second end direction thereof. The plural outer introduction oil passages 5 are arranged in radial directions having intervals between adjacent outer introduction oil passages 5. An inlet of the outer introduction oil passage 5 is in communication with the outer fluid tight chamber 4 and an outlet of the outer introduction oil passage 5 is in communication with an inner fluid tight chamber 6 which is shaped hollowing an internal portion of the input shaft 2 in a circumferential direction.

The first end of the output shaft 3 is positioned inside the input shaft 2 (i.e., the left side in FIGS. 1-2) and is supported by the pilot bearing 35 which includes a rod shaped roller so that the output shaft 3 rotates relative to the input shaft 2. The second end of the output shaft 3 is supported at the casing 1 by means of the ball bearing portion 98. An external portion of the output shaft 3 which faces the inner fluid tight chamber 6 is hollowed in a circumferential direction to form the inner fluid tight chamber 6 (i.e., an inner wall of the inner fluid tight chamber 6). As shown in FIG. 2, a groove is circumferentially formed throughout an outer surface of the output shaft 3 at the right side relative to the inner fluid tight chamber 6 in FIG. 2. A packing 61 is provided in the groove formed on the outer surface of the output shaft 3. The pilot bearing 35 is provided at the left side relative to the inner fluid tight chamber 6 in FIG. 2. Plural penetration holes serving as inner introduction oil passages 7 are formed in the output shaft 3 in radial directions to establish the communication between the inner fluid tight chamber 6 and the axial oil passage 31. The inner introduction oil passages 7 are formed circumferentially spaced with adjacent inner introduction oil passages 7.

The lubrication fluid supply passage includes the outer fluid tight chamber 4, the outer introduction oil passage 5, the inner fluid tight chamber 6, and the inner introduction oil passage 7. The lubrication fluid supplied from the pump oil passage 8 is introduced to the outer fluid tight chamber 4 with pressure, the outer introduction oil passage 5, the inner fluid tight chamber 6, and the inner introduction oil passage 7 and is supplied to the axial oil passage 31 of the output shaft 3. The lubrication fluid supply passage can be structured without the inner introduction oil passage 7. In those circumstances, the lubrication fluid is supplied from the inner fluid tight chamber 6 to the axial oil passage 31 through a gap between the pilot bearing 35 and the output shaft 3 via the left side of the axial oil passage 31 in FIG. 2.

Figure 3:
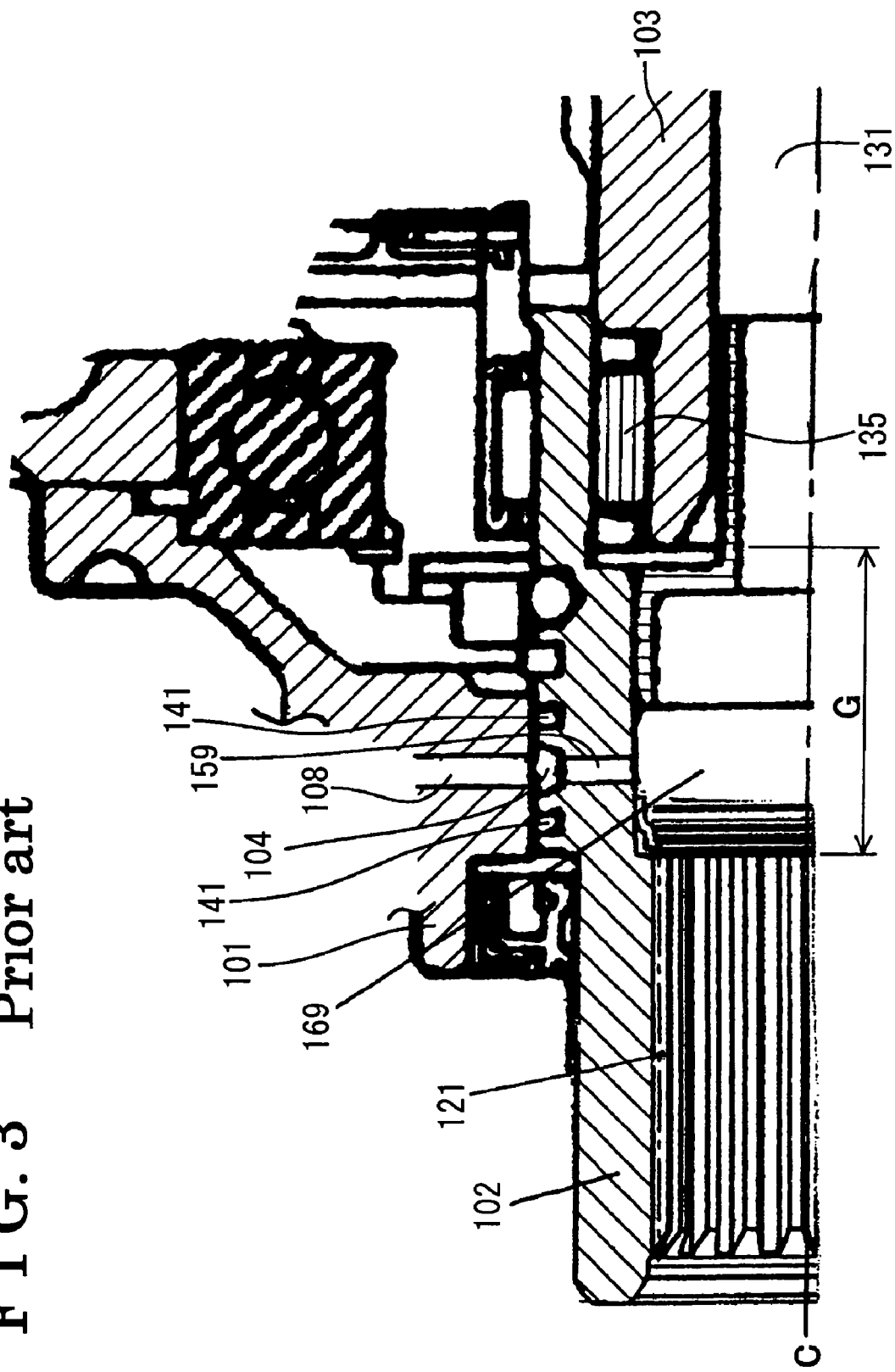
FIG. 3 a partial cross-sectional view for a main portion of a known transfer device.

Effects of the transfer device according to the embodiment of the present invention will be explained as follows in comparison with the known transfer device. As shown in FIG. 3, the known transfer device includes an introduction oil passage 159 penetrating an input shaft 102 in a radial direction from an outer fluid tight chamber 104 to an axial center. The introduction oil passage 159 is in communication with an inner fluid tight chamber 169 which is positioned at the axial center portion of the input shaft 102. The inner fluid tight chamber 169 and an axial oil passage 131 provided in an output shaft 103 are in communication with each other in an axial direction to supply the lubrication fluid to the axial oil passage 131. With the construction of the known transfer device, in order to form the inner fluid tight chamber 169, a significant length G shown in FIG. 3 is required to be provided between a spline 121 of the input shaft 102 and the output shaft 103. On the other hand, as shown in FIG. 2, with the construction of the embodiment of the present invention, the length G is not required, and a length corresponding to length L in an axial direction of the entire device (shown in FIG. 1) can be reduced by the length G. The reduction in length of the length L in the axial direction of the entire transfer device enables to downsize the transfer device 9 and contributes to streamline the vehicle and to the freedom of design.

According to the embodiment of the present invention, by providing the lubrication fluid supply passage which is formed in the input shaft in the axial direction and further in the output shaft, the length of the transfer device per se in the axial direction is shortened.

The input shaft shaped approximately in the cylindrical form is supported by the casing so as to rotate, and is driven by means of the drive shaft which is engaged to a first end thereof. As a support portion of the casing, for example, an oil seal which slidably rotates may be applied. A ball bearing may also be applied to the support portion. However, it is not necessary to support the full weight of the input shaft by the support portion because the driveshaft, which is positioned outside the input shaft, is engaged with the input shaft to drive thereof. The output shaft of the transmission can be applied as the driveshaft, and is engaged with the spline which is formed on the internal wall of the input shaft by a predetermined length from the first end of the input shaft.

The first end of the output shaft can be supported on the internal surface of the input shaft so as to be relatively rotatable to the input shaft via, for example, the pilot bearing. The second end of the output shaft can be supported by the casing so as to rotate. The output shaft is engaged with the input shaft either directly or indirectly via the auxiliary transmission mechanism, or the like, to transmit the torque. Further, by providing the center differential, the torque is distributed to the second output shaft to drive the both front wheels and the rear wheels. In addition, inside the output shaft, the passage formed in the axial direction (i.e., axial oil passage) and the passage formed in the radial direction (i.e., radial oil passage), which is in communication with the axial oil passage, are provided.

The lubrication fluid supply passage, which supplies the lubrication fluid from the casing to the axial oil passage of the output shaft, includes the outer fluid tight chamber, the outer introduction oil passage, the inner fluid tight chamber, and the inner introduction oil passage. The outer fluid tight chamber is formed in the annular space between the casing and the input shaft. The annular space may be formed, for example, by providing the groove in the peripheral direction either on the inner surface of the casing or on the outer surface of the input shaft. The outer introduction oil passage may be formed in the input shaft, in order to establish the communication between the outer fluid tight chamber and the inner periphery of the input shaft, by forming at least one hole, which extends from the outer fluid tight chamber towards the second end side of the input shaft in the axial direction, in the input shaft. The lengths of an external diameter and an internal diameter of the input shaft may be partially changed for forming the hole in the input shaft only in the axial direction. Alternatively, a bent hole may be formed by combining a hole formed in the axial direction and a hole formed in the radial direction. The inner fluid tight chamber, which is in communication with the outer introduction oil passage, is formed in the annular space between the input shaft and the output shaft. The inner fluid tight chamber is, for example, formed by a groove provided either on the inner surface of the input shaft or on the outer surface of the output shaft, or by combining grooves formed on the both inner surface of the input shaft and outer surface of the output shaft. The inner introduction oil passage establishes the communication between the inner fluid tight chamber and the axial oil passage formed in the output shaft. For example, the inner introduction oil passage may be formed by forming at least one hole in the output shaft in a radial direction.

Further, when the spline engagement portion is formed on the internal surface of the input shaft from the first end by a predetermined length, the outer fluid tight chamber can be formed outside the spline engagement portion. Further, by forming the inner fluid tight chamber outside the range of the spline, the communication between the outer fluid tight chamber and the inner fluid tight chamber can be established by the outer introduction oil passage.

A method for supplying the lubrication fluid to the outer fluid tight chamber will be explained as follows. It is preferable that the transfer device for the vehicle includes the pump, which is driven by the rotation of the input shaft and supplies the lubrication fluid with pressure to the outer fluid tight chamber. It is effective to supply the lubrication fluid with pressure by the pressure greater than the centrifugal force for introducing the lubrication fluid into the output shaft. For supplying the oil with pressure, it is preferable to use a pump which has the input shaft stably rotating without being affected by the gear ratio and the connection and disconnection of the center differential, or the like, as a drive source without applying additional operational source. A trochoid pump or a vane pump, or the like, can be applied to the pump. The pump may be provided in the vicinity at the external periphery or the end portion of the input shaft.

A trochoid pump operates using the increase and decrease of the capacity of the space between teeth by eccentrically rotating an inner rotor and an outer rotor which have the different number of teeth from one another. Namely, the lubrication fluid is sucked from the casing in a process where the capacity of the space increase to produce the negative pressure and the lubrication fluid sucked in a process where the capacity of the space decreases to produce the positive pressure is supplied to the outer fluid tight chamber. Likewise, the vane pump operates using the increase and decrease of the capacity of the space between vane members which rotate while sliding relative to a stator by the eccentric rotation of a rotor including the plural vane members in the stator.

An operation of the transfer device will be explained as follows. An operation for introducing the lubrication fluid will be mainly explained. An operation for transmitting the torque is likewise the known transfer device. When the driveshaft which is engaged with the input shaft rotates, the input shaft and the pump rotate. The lubrication fluid sucked from the casing by the pump is supplied into the outer fluid tight chamber to spread over in peripheral directions. Then, the lubrication fluid reaches the inner fluid tight chamber via the outer introduction passage which is in communication with the outer fluid tight chamber, and further reaches the axial oil passage formed in the output shaft via the inner introduction oil passage. Eventually, the lubrication fluid is supplied to portions including the gear mechanism, or the like, which are positioned at an external periphery of the shaft from the radial oil passage which is in communication with the axial oil passage by the centrifugal force to lubricate therein.

With the construction of the transfer device for the vehicle according to the embodiment of the present invention, because the lubrication fluid supply passage is formed by penetrating the input shaft in the axial direction and penetrating the output shaft, it is not necessary to provide the lubrication fluid supply passage between the driveshaft located outside the transfer device and the output shaft. Accordingly, the length of the transfer device for the vehicle in the axial direction can be reduced by the length of the lubrication fluid supply passage to downsize the transfer device per se.

Although the locked state and the free state of the center differential 92 are switched in the embodiment shown in FIG. 1, the construction of the transfer device according to the embodiment of the present invention is applicable to a construction which selectively switches between a four-wheel drive and a two-wheel drive (e.g., a rear-wheel drive).

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A transfer device for a vehicle, comprising:
a casing;
a cylindrical input shaft supported by the casing so as to rotate, a first end of the input shaft engaging with a driveshaft for driving the input shaft;
an output shaft supported on an internal surface of a second end of the input shaft so as to relatively rotate and directly or indirectly engaging with the second end of the input shaft to transmit a torque to driven members, the output shaft including an oil passage formed therein in an axial direction;
a lubrication fluid supply passage supplying a lubrication fluid from the casing to the oil passage formed in the axial direction in the output shaft; the lubrication fluid supply passage comprising:
an inner fluid tight chamber annularly formed with an external surface of the output shaft and an internal surface of the input shaft;
a first passage establishing a communication between the inner fluid tight chamber and the oil passage formed in the axial direction;
a second passage extending in the axial direction for establishing a communication between the inner fluid tight chamber and an external surface of the input shaft, the second passage being parallel to the oil passage in the output shaft; and
wherein the input shaft is formed with a spline on the internal surface thereof, the spline extending over a predetermined length from the first end of the input shaft, the spline engages with the drive shaft, an outer fluid tight chamber is formed within a range of the predetermined length from the first end of the input shaft so as to axially overlap with the spline, and the inner fluid tight chamber is formed outside the range of the predetermined length from the first end of the input shaft so that the inner fluid tight chamber does not axially overlapping with the spline.

2. The transfer device for the vehicle according to claim 1, further comprising: an outer fluid tight chamber axially spaced from the inner fluid tight chamber, a pump driven by a rotation of the input shaft to supply the lubrication fluid with pressure into the outer fluid tight chamber.

3. The transfer device for the vehicle according to claim 1, further comprising: a pump driven by a rotation of the input shaft to supply the lubrication fluid with pressure into the outer fluid tight chamber.

4. A transfer device for a vehicle, comprising:
a casing;
a cylindrical input shaft rotatably supported by the casing, the input shaft comprising a first end engaging a driveshaft for driving the input shaft, the input shaft possessing an external surface and an internal surface;
an output shaft having a first end relatively rotatably supported on the internal surface of a second end of the input shaft and directly or indirectly engaging the second end of the input shaft to transmit torque to driven members, the output shaft including an axially extending oil passage, the output shaft possessing an exterior surface;
the external surface of the output shaft and the internal surface of the input shaft comprising axially overlapping portions which axially overlap each other;
an annular inner fluid-tight chamber bounded by the axially overlapping portions of the external surface of the output shaft and the internal surface of the input shaft which axially overlap each other;
a first passage establishing communication between the inner fluid tight chamber and the axially extending oil passage in the output shaft;
a second passage extending from the inner fluid-tight chamber to the external surface of the input shaft, the second passage being parallel to the oil passage in the output shaft;
the inner fluid-tight chamber, and the first and second passages permitting supply of a lubrication fluid from the casing to the oil passage in the output shaft;
an outer fluid-tight chamber bounded by the exterior surface of the input shaft and an interior surface of the casing; and
wherein the internal surface of the input shaft comprises an axially extending spline that engages the drive shaft, and the outer fluid-tight chamber is positioned so that the outer fluid-tight chamber axially overlaps the spline, the inner fluid-tight chamber being axially spaced from the outer fluid-tight chamber so that the inner fluid-tight chamber does not axially overlap the spline.

5. The transfer device for the vehicle according to claim 4, wherein the second passage has one end opening into the inner fluid-tight chamber and an opposite end opening into the outer fluid-tight chamber.

6. The transfer device for the vehicle according to claim 4, further comprising a pump driven by a rotation of the input shaft and communicating with the outer fluid-tight chamber to supply the lubrication fluid under pressure into the outer fluid tight chamber.

7. The transfer device for the vehicle according to claim 4, wherein the second passage is an axially extending passage.

8. The transfer device for the vehicle according to claim 4, wherein the output shaft is comprised of a wall surrounding the oil passage, and the first passage is a through passage passing though the wall of the output shaft.

9. The transfer device for the vehicle according to claim 4, wherein the first end of the output shaft is relatively rotatably supported on the internal surface of the second end of the input shaft by way of a bearing positioned radially between the exterior surface of the output shaft and the interior surface of the input shaft, the first end of the out put shaft comprising a free end, the bearing being positioned axially between the inner fluid-tight chamber and the free end of the output shaft.

10. The transfer device for the vehicle according to claim 4, wherein the second passage extends is a passage extending through a wall of the input shaft.

* * * * *